(12) United States Patent
Dunnings et al.

(10) Patent No.: US 10,795,721 B2
(45) Date of Patent: Oct. 6, 2020

(54) TRANSFERRING TASKS FROM FAILING DEVICES USING IOT (71) Applicant: International Business Machines Corporation, Armonk, NY (US)

(72) Inventors: Andrew Dunnings, Southampton (GB); Simon Page, Southampton (GB); Joseph Payne, London (GB); Andrew Hurt, Winchester (GB); Eunjin Lee, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 16/179,819

(22) Filed: Nov. 2, 2018

(65) Prior Publication Data
US 2020/0142731 A1 May 7, 2020

(51) Int. Cl.
G06F 9/48 (2006.01)
G06F 9/50 (2006.01)
G06F 11/20 (2006.01)
H04L 29/08 (2006.01)

(52) U.S. Cl.
CPC .......... *G06F 9/4856* (2013.01); *G06F 9/5094* (2013.01); *G06F 11/203* (2013.01); *G06F 11/2033* (2013.01); *H04L 67/10* (2013.01)

(58) Field of Classification Search
CPC .................................................... G06F 9/4856
See application file for complete search history.

(56) References Cited

U.S. PATENT DOCUMENTS

| | | | |
|---|---|---|---|
| 8,750,677 B2 | 6/2014 | Brown et al. | |
| 9,313,261 B2 | 4/2016 | Singh et al. | |
| 10,536,394 B2 * | 1/2020 | Eckstein | H04L 67/10 |
| 2014/0317280 A1 * | 10/2014 | Ke | H04L 41/5067 709/224 |
| 2017/0207646 A1 | 7/2017 | Boss et al. | |

OTHER PUBLICATIONS

"Amazon Echo (2nd Gen)—Smart speaker with Alexa—Charcoal Fabric", retrieved from [https://www.amazon.co.uk/Amazon-Echo-2nd-Generation-Charcoal-Fabric/dp/B06Y5ZW72J/ref=sr_1_2?s=digital-text&ie=UTF8&qid=1510308404&sr=1-2&keywords=alexa&dp.ID=51TFnR7AtGL&preST=_SY300_QL70_&dpSrc=srch | on Oct. 2018.

DynatraceStore, "Amazon Echo Dot 2nd Generation", retrieved from [http://dynatrace.qmigroupinc.com/amazon-echo-dot-2nd-generation.html] on Apr. 2018.

* cited by examiner

*Primary Examiner* — Charlie Sun
(74) *Attorney, Agent, or Firm* — North Shore Patents, P.C.; Michele Liu Baillie (57) ABSTRACT In a transfer of tasks between devices in a network, a failing device determines that it will not complete a task. The failing device compares the requirements of the task with sets of device capabilities on a device list, where each set is associated with a device in the network. The failing device determines that the requirements of the task matches, a set of device capabilities associated with a given device, and in response, sends a request to transfer the given task to the given device. When a rejection of the request is received, the failing device compares the requirements of the task with remaining sets of device capabilities on the device list, determines that the requirements of the task matches a second set of device capabilities associated with a second given device, and in response, sends a second request to transfer the task to the second given device.

20 Claims, 5 Drawing Sheets

TRANSFERRING TASKS FROM FAILING DEVICES USING IOT

BACKGROUND

Currently, tasks which are initiated on a certain device are confined to being executed by that device. A task could be anything that is executable by a device, such as an alarm, streaming music or video, using social media, etc. However, something can subsequently occur that prevents the device from executing or completing the task. For example, the device may run out of battery before or during the execution of the task. In this case, the execution of the task would stop prior to completion or not be executed at all.

SUMMARY

Disclosed herein is a method for the transfer of tasks from a device in a network, and a computer program product and system as specified in the independent claims. Embodiments of the present invention are given in the dependent claims. Embodiments of the present invention can be freely combined with each other if they are not mutually exclusive.

According to an embodiment of the present invention, in a transfer of a task from a device in a network, where the network includes a plurality of devices, a failing device determines that the failing device will not be able to complete one or more tasks configured on the failing device. The failing device compares the requirements of a given task of the one or more tasks with sets of device capabilities on a device list, where each set of device capabilities being associated with a device of the plurality of devices. The failing device determines that the requirements of the given task match a given set of device capabilities associated with a given device, and in response, sends a request to transfer the given task to the given device.

In one aspect of the present invention, the failing device determines whether an acceptance or a rejection of the request is received from the given device. When the failing device receives the rejection of the request from the given device, the failing device compares the requirements of the given task with remaining sets of device capabilities on the device list. The failing device determines that the requirements of the given task match a second given set of device capabilities associated with a second given device, and in response, sends a second request to transfer the given task to the second given device.

In one aspect of the present invention, in response to receiving the request to transfer the given task, the given device determines whether resources are available at the given device to complete the given task. In response to determining that the resources are available at the given device to complete the given task, the given device sends an acceptance of the request to the failing device and configures the given task on the given device. In, response to determining that the resources are not available at the given device to complete the given task, the given device sends a rejection of the request to the failing device.

DETAILED DESCRIPTION

An "IoT device," as the term is used herein, is a device that is capable of communicating via a network, typically via wireless communication, and capable of executing one or more predetermined tasks due to its design and manufacture according to predetermined specifications. One example IoT device receives an alarm configuration via a user interface on the device, to produce an audio and/or visual output at the configured data, and time. However, IoT devices are not currently capable of automatically transferring performance of their functions to other IoT devices in a manner where the IoT devices communicate with one another to autonomously perform the transference themselves. That is, IoT devices are not currently configured with program modes or circuitry to autonomously perform such transference functions.

Embodiments of the present invention involve a recognition that by adding previously non-existent functionality to IoT devices, as disclosed herein, then it is possible in certain applications for a first IoT device to autonomously transfer a task to a second IoT device without a user manually reconfiguring the task on the second IoT device. By adding previously non-existent module(s) to the IoT device, it would be possible for the IoT devices to communication with one another an autonomously transfer configured tasks.

According to some embodiments of the present invention, when a device determines it will be prevented from completing a task to which it has been assigned, the device will send a request to transfer the task to another capable device on IoT network. If the other device accepts the request, then the other device automatically configures the task to be executed. If the other device rejects the request, then the device attempts to identify another capable device on the network to which to transfer the task.

Figure 1:
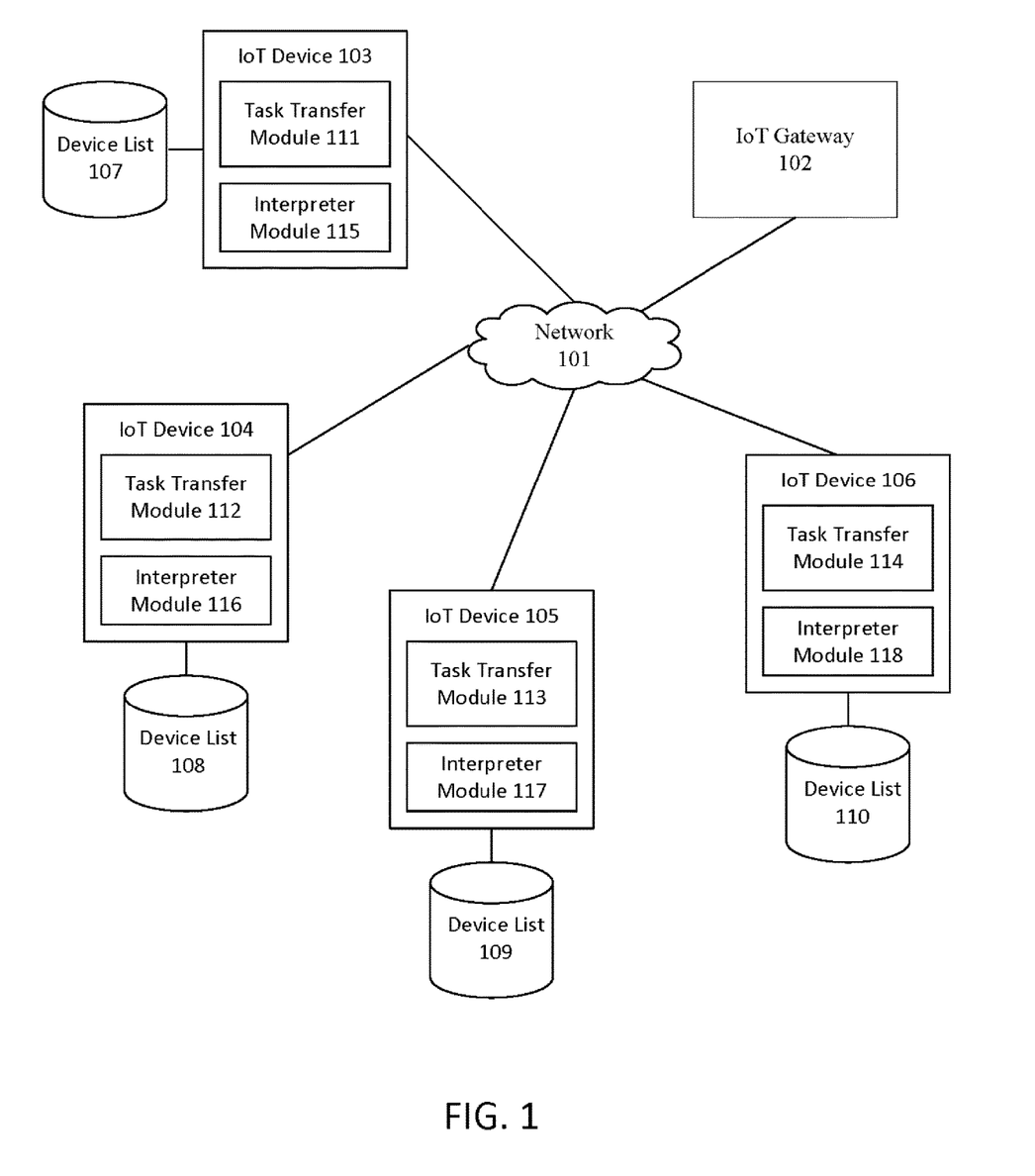
FIG. 1 illustrates an example IoT network for the transfer of tasks from a device according to some embodiments.

FIG. 1 illustrates an example IoT network for the transfer of tasks from a device according to some embodiments. The network 101 includes an IoT gateway 102 and a plurality of IoT devices 103-106. The IoT gateway 102 manages and facilitates the communications between the devices 103-106 in the network 101. Each device 103-106 stores a local device list 107-110 that includes a list of devices 103-106 in the network 101 and their respective capabilities. Each device 103-106 further includes a task transfer module 111-114 for implementing the transfer of tasks from one IoT device to another and an interpreter module 115-118 for translating a task transferred from one IoT device into a device specific format for another IoT device. The functionalities of the task transfer module 111-114 and the interpreter module 115-118 are described further below.

Figure 2:
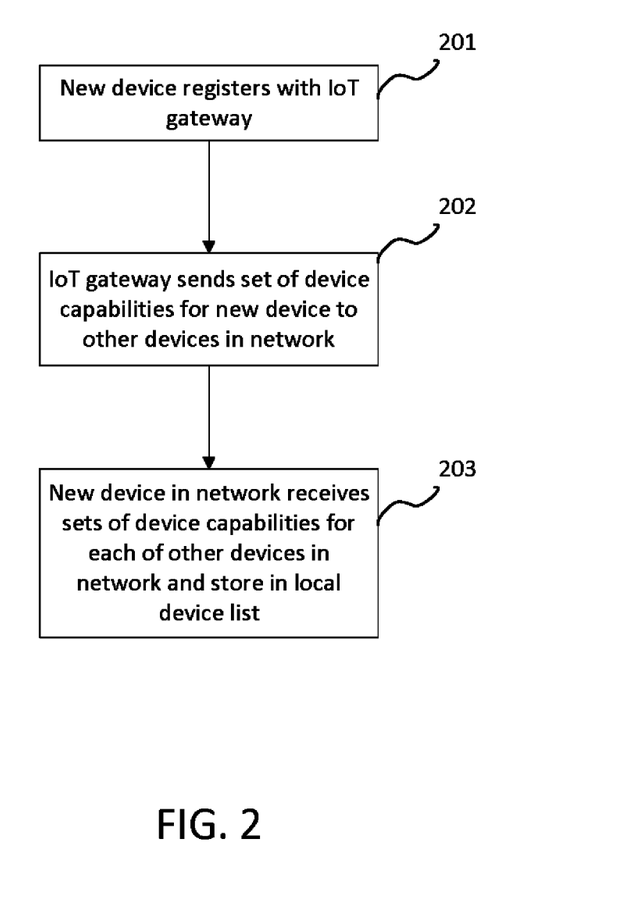
FIG. 2 illustrates a setup of the network for the transfer of tasks according to some embodiments.

FIG. 2 illustrates a setup of the network for the transfer of tasks according to some embodiments. When a new device (e.g. device 103) joins the network 101, the new device 103 registers with the IoT gateway 102 (201), including sending to the IoT gateway 102 a set of device capabilities for the new device. The capabilities may include, but are not limited to, processing capabilities, memory capabilities, network connectivity, and audio or video streaming capabilities. The IoT gateway 102 sends the set of device capabilities for the new device 103 to the other devices 104-106 in the network 101 (202). Each of the other devices 104-106 stores the set of device capabilities for the new device 103 in its respective local device list 108-110. The IoT gateway 102 further sends to the new device 103 the sets of device capabilities for each of the other devices 104-106 in the network 101. The new device 103 stores the sets of device capabilities for the other devices 104-106 in its local device list 107.

Figure 3:
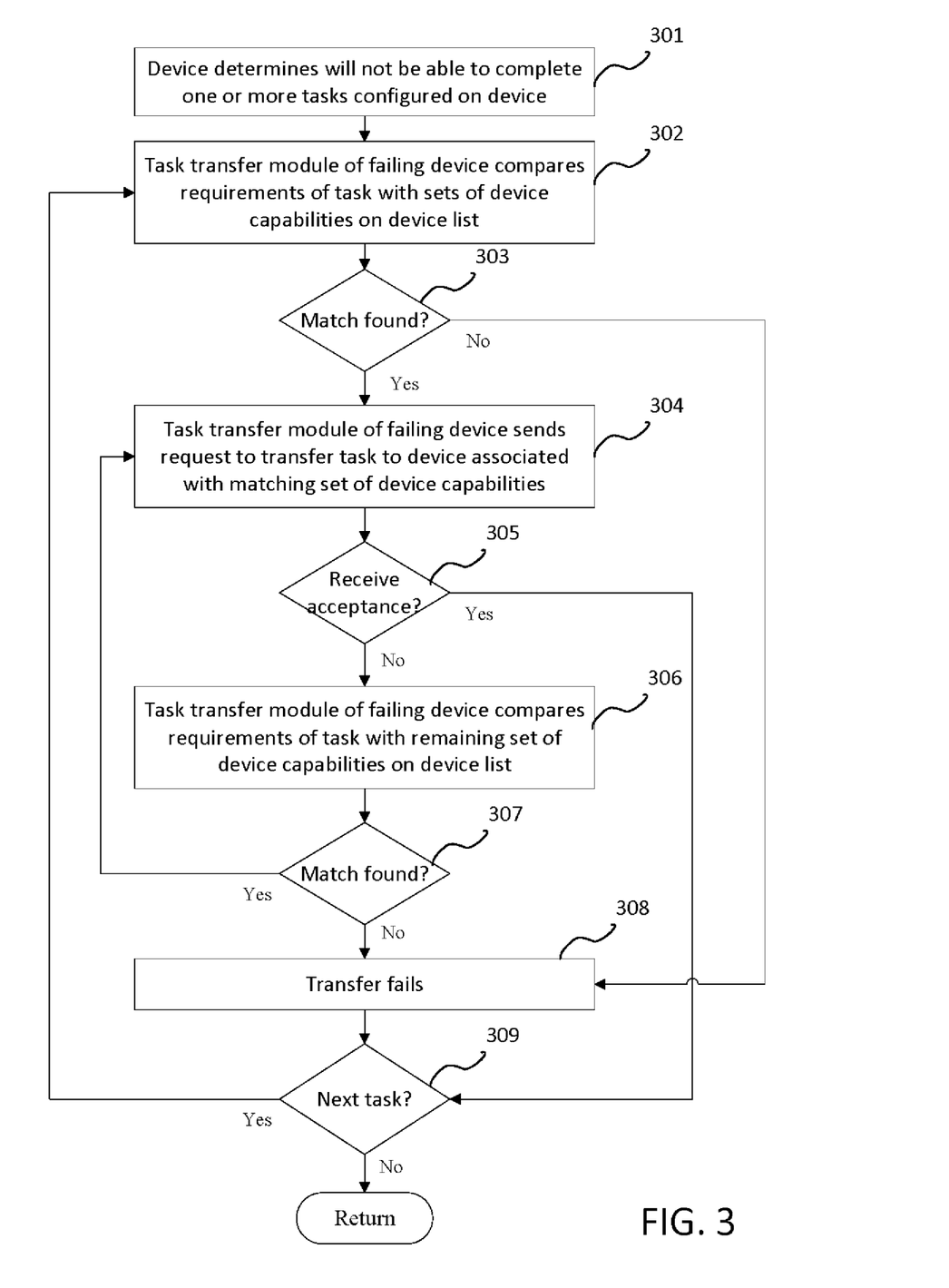
FIG. 3 illustrates a transfer of tasks from a device according to some embodiments.

FIG. 3 illustrates a transfer of tasks from a device according to some embodiments. The device 103 includes a set of configured tasks, such as the sounding of an audio alarm at a certain time or the streaming of a video. At some point, the device 103 determines that it will not be able to complete one or more of the tasks configured on the device 103 (301). For example, the device 103 may determine that the battery will be depleted before the completion of the task. In response, the task transfer module 111 of the failing device 103 compares the requirements of the task with the sets of device capabilities on the device list 107 (302). If a match is found (303), where a given set of device capabilities matches the requirements of the task, then the task transfer module 111 of the failing device 103 sends a request to transfer the task to the device (e.g. device 104) associated with the matching set of device capabilities (304). In some embodiments, the failing device 103 and the device 104 are from different manufacturers or providers and thus their format requirements may differ. If so, prior to the sending of the request, the interpreter module 115 at the failing device 103 translates the request into a format according to the formatting requirements of the device 104, as described further below. The formatting requirements may be included with the sets of device capabilities and shared among the plurality of devices 103-106. If the task transfer module 111 of the failing device 103 receives an acceptance of the request (305) from the device 104, then the transfer of this task is complete. If the task transfer module 111 of the failing device 103 receives a rejection of the request from the device 104 (305), then the task transfer module 111 compares the requirements of the task with the remaining sets of device capabilities on the device list 107 (306). If a match is found (307), then the task transfer module 111 of the failing device 103 sends a request to the device (e.g. device 105) associated with the matching set of device capabilities (304) and blocks 305-307 are repeated. If the task transfer module 111 of the failing device 103 finds that none (303) or no other (307) set of device capabilities on the device list 107 matches the requirements of the task, then the task transfer fails (308). In response, an alert or notification may be sent to the user of the failing device 103. Blocks 302-308 are repeated for each task the failing device 103 will not be able to complete (309).

Figure 4:
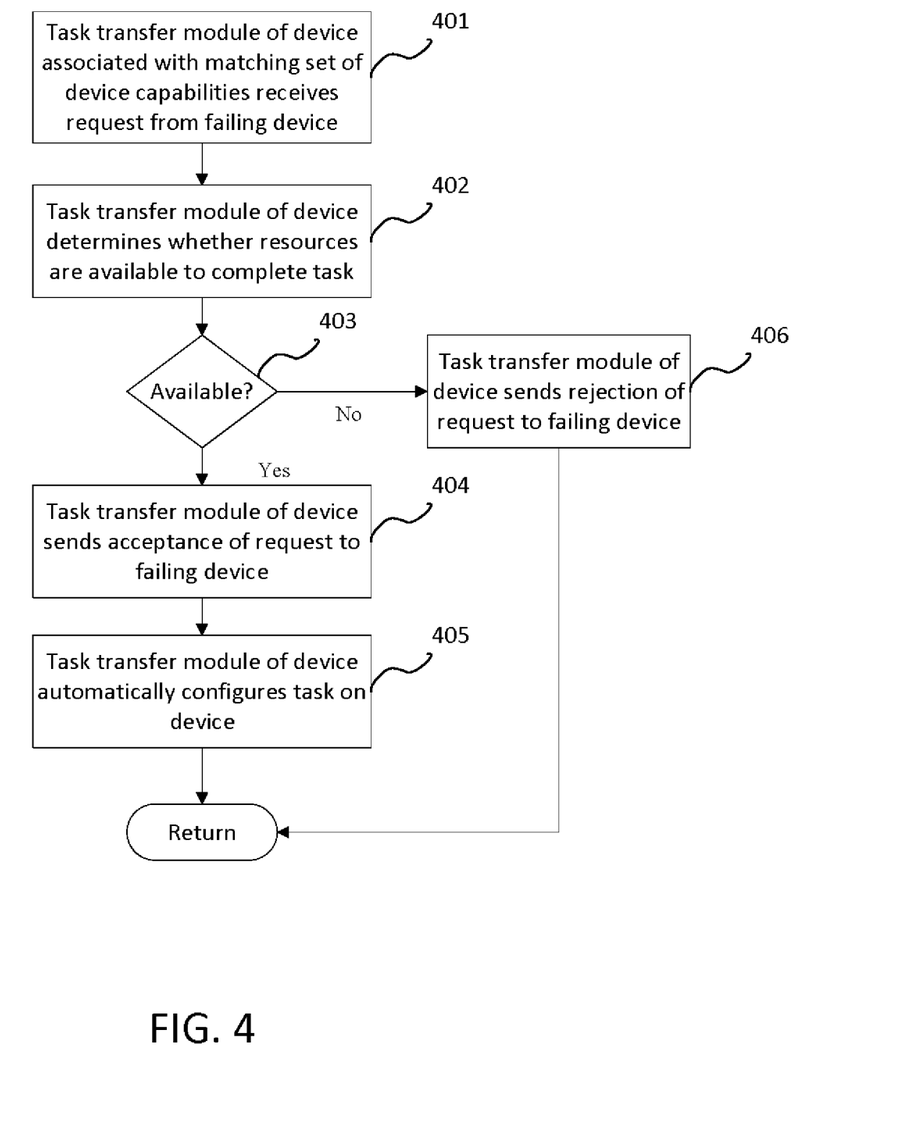
FIG. 4 illustrates a transfer of tasks to a device according to some embodiments.

FIG. 4 illustrates a transfer of tasks to a device according to some embodiments. The task transfer module (112 or 113) of the device (104 or 105) associated with the matching set of device capabilities receives from the failing device 103 the request to transfer the task (401). In response, the task transfer module (112 or 113) of the device (104 or 105) determines whether resources are available to complete the task (402). For example, the task transfer module (112 or 113) of the device (104 or 105) determines whether there is sufficient battery charge to complete the task. For another example, the task transfer module (112 or 113) of the device (104 or 105) determines whether there are higher priority tasks that will prevent it from completing the task. If the task transfer module (112 or 113) of the device (104 or 105) determines that there are not enough resources available to complete the task (403), then the task transfer module (112 or 113) sends a rejection of the request to the failing device 103 (406). If the task transfer module (112 or 113) of the device (104 or 105) determines that there are enough resources available to complete the task (403), then the task transfer module (112 or 113) sends an acceptance of the request to the failing device 103 (404). The task transfer module (112 or 113) of the device (104 or 105) then automatically, without user intervention, configures the task on the device (104 or 105) (405).

According to some embodiments of the present invention, a standard communication format, i.e., protocol, is provided for task requests, so that such requests can be processed by any device regardless of its make, manufacturer, or model. The interpreter modules 115-118 provided to the IoT devices 103-106 according to embodiments of the present invention translate the task requests communicated in the standard format, so that a task request translated for a respective device is in a form that the respective device can recognize and process. Example communication formats for task requests include, but are not limited to, the following:

Using <alarm_app>, set <alarm_function>, set at <time>
Using <video_app>, play <video_name>, starting at <timestamp>

For example, a smart assistant IoT device may set alarms internally with 'set alarm 9:00'. When this alarm task is to be transferred to IoT lights, the interpreter module of the smart assistant IoT device translates the format of the alarm task to 'schedule light 9:00', according to the formatting requirements of the IoT lights. Alternatively, the smart assistant IoT device sends the task request to the IoT lights without translation, and the IoT lights, using the formatting requirements of the smart assistant IoT device, translates the received task request to its native format.

In some embodiments, different tasks are transferred to different devices based on the capabilities of the devices. For example, assume that the failing device 103 is configured with an audio alarm task and a video streaming task that the failing device 103 will not be able to complete. Assume that a first device 104 is associated a first set of device capabilities matching the requirements of the audio alarm task but not matching the requirements of the video streaming task, while a second device 105 is associated with a second set of device capabilities matching the requirements of the video streaming task. The task transfer module 111 of the failing device 103 sends a first request to transfer the audio alarm task to the first device 104 and sends a second request to transfer the video streaming task to the second device 105.

In some embodiments, more than one set of device capabilities on the device list 107 matches the requirements of a task. In one exemplary embodiment, the task transfer module 111 of the failing device 103 randomly selects an associated device from among the matching sets of device capabilities. In another exemplary embodiment, the task transfer module 111 of the failing device 103 selects the associated device in a round robin or load balancing fashion. In another exemplary embodiment, the task transfer module 111 of the failing device 103 weighs the associated device selection based on user configured preferences. In yet another exemplary, embodiment, the task transfer module 111 of the failing device 103 leverages data from other devices in the IoT network to weigh the selection of the associated device. For example, data from sensors in the IoT network are used to determine a user's proximity to various devices in the network 101, and the associated device with the closest proximity to the user is selected.

For example, assume the IoT network 101 includes a smart phone configured with an alarm task for a set time and a smart assistant device. Referring to FIG. 3, at some point, the smart phone determines that its battery will be depleted before the set time and thus will not be able to complete the alarm task (301). The task transfer module of the smart phone accesses its local device list 107 and compares the alarm task requirements with the sets of device capabilities on the device list 107 (302). Assume that the task transfer module of the smart phone determines that the set of device capabilities associated with a smart assistant device matches the alarm task requirements (303). The task transfer module of the smart phone then sends a request to transfer the alarm task to the smart assistant device (304).

Referring to FIG. 4, the task transfer module of the smart assistant device receives the request from the task transfer module of the smart phone (401) and determines whether resources are available to complete the alarm task (402). If the task transfer module of the smart assistant device determines there are insufficient resources to complete the alarm task, then the task transfer module of the smart assistant device sends a rejection of the request to the smart phone (406). If the task transfer module of the smart assistant determines that there are sufficient resources available to complete the alarm task, then the task transfer module of the smart assistant device sends an acceptance of the request to the smart phone (404) and configures the alarm task on the smart assistant device (405).

Referring again to FIG. 3, if the task transfer module of the smart phone receives an acceptance of the request from the smart assistant device (305), then the alarm task transfer is complete. If the task transfer module of the smart phone receives a rejection of the request from the smart assistant device (305), then the task transfer module of the smart phone compares the alarm task requirements with the remaining sets of device capabilities on device list 107 (306). If a match is found, then the task transfer module of the smart phone repeats blocks 304-307. Otherwise, the transfer of the alarm task fails (308).

In some embodiments, the failing device 103 determines that it will not be able to complete a task while performing the task and the remainder of the task is to be transferred to another device. For example, assume that an automated forklift is configured with a moving task to move an item to a specified destination. Referring to FIG. 3, assume that when the forklift reaches a given location, the forklift determines that its battery will be depleted before it reaches the destination (301). Assume that the task requires the capability of moving an item of a certain weight and size. The task transfer module of the forklift then determines whether there is another forklift in the network associated with a set of device capabilities matching the requirements of moving an item of the certain weight and size (302). Assume that the task transfer module of the failing forklift finds a matching set of device capabilities (303), and in response, sends a request that includes the given location to the forklift associated with the matching set of device capabilities (304).

Referring to FIG. 4, the task transfer module of the associated forklift receives the request from the failing forklift (401) and determines the resources available to complete the moving task (402). Assume that the task transfer module of the associated forklift determines that it has battery power sufficient for moving the item from the given location to the destination (403), and in response, sends an acceptance of the request to the failing forklift (404). The task transfer module of the associated forklift configures itself to move the item from the given location to the destination (405). Referring again to FIG. 3, the task transfer module of the failing forklift receives the acceptance of the request (305), and the transfer of the remainder of the moving task is complete.

Figure 5:
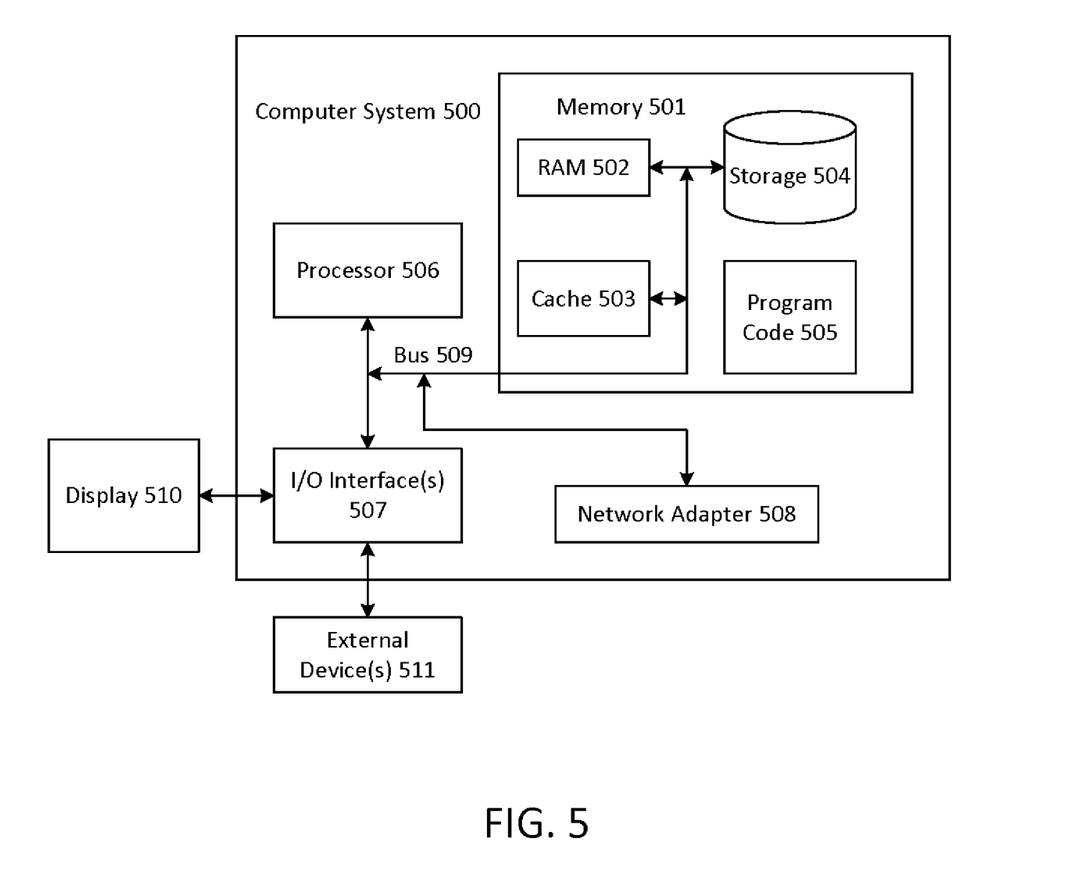
FIG. 5 illustrates a computer system, one or more of which implements the embodiments of the present invention.

FIG. 5 illustrates a computer system, one or more of which implements the embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 108.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium onto an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program, instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a transfer of a task from a device in a network, the network comprising a plurality of devices comprising:
    determining, by a failing device of the plurality of devices, that the failing device will not be able to complete one or more tasks configured on the failing device;
    comparing, by the failing device, requirements of a given task of the one or more tasks with sets of device capabilities on a device list, each set of device capabilities being associated with a device of the plurality of devices;
    determining, by the failing device, that the requirements of the given task match a given set of device capabilities associated with a given device; and
    in response, sending, by the failing device to the given device, a request to transfer the given task.

2. The method of claim 1, further comprising:
    determining, by the failing device, whether an acceptance or a rejection of the request is received from the given device;
    in response to receiving the rejection of the request from the given device, comparing, by the failing device, the requirements of the given task with remaining sets of device capabilities on the device list;
    determining, by the failing device, that the requirements of the given task match a second given set of device capabilities associated with a second given device; and
    in response, sending, by the failing device to the second given device, a second request to transfer the given task.

3. The method of claim 2, further comprising:
when no other set of device capabilities on the device list matches the requirements of the given task, failing the task transfer.

4. The method of claim 1, further comprising:
in response to receiving the request to transfer the given task, determining, by the given device, whether resources are available at the given device to complete the given task;
in response to determining that the resources are available at the given device to complete the given task, sending, by the given device to the failing device, an acceptance of the request and configuring the given task on the given device; and
in response to determining that the resources are not available at the given device to complete the given task, sending, by the given device to the failing device, a rejection of the request.

5. The method of claim 1, wherein the comparing of the requirements of the given task and the sending of the request comprise:
comparing, by the failing device, the sets of device capabilities on the device list with requirements of a first given task and requirements of a second given task of the one or more tasks;
determining, by the failing device, that a first set of device capabilities associated with a first given device matches the requirements of the first given task and a second set of device capabilities associated with a second given device matches the requirements of the second given task; and
in response, sending, by the failing device, a first request to the first given device to transfer the first given task and a second request to the second given device to transfer the second given task.

6. The method of claim 1, wherein the determining that the requirements of the given task match the given set of device capabilities and the sending of the request comprise:
determining, by the failing device, that two or more sets of device capabilities on the device list match the requirements of the given task;
using data from one or more of the plurality of devices in the network, selecting, by the failing device, a given set of the two or more sets of device capabilities; and
sending, by the failing device, the request to transfer the given task to the given device associated with the given set of the two or more sets of device capabilities.

7. The method of claim 1, wherein the determining that the failing device will not be able to complete the one or more tasks and the sending of the request comprise:
during the performance of the given task, determining, by the failing device, that the failing device will not be able to complete the given task; and
sending, by the failing device to the given device, the request to transfer a remainder of the given task to the given device.

8. A computer readable storage medium having program instructions embodied therewith for transferring a task from a device in a network, the network comprising a plurality of devices, the program instructions executable by one or more processors to cause the one or more processors to:
determine, by a failing device of the plurality of devices, that the failing device will not be able to complete one or more tasks configured on the failing device;
compare, by the failing device, requirements of a given task of the one or more tasks with sets of device capabilities on a device list, each set of device capabilities being associated with a device of the plurality of devices;
determine, by the failing device, that the requirements of the given task match a given set of device capabilities associated with a given device; and
in response, send, by the failing device to the given device, a request to transfer the given task.

9. The medium of claim 8, wherein the one or more processors are further caused to:
determine, by the failing device, whether an acceptance or a rejection of the request is received from the given device;
in response to receiving the rejection of the request from the given device, compare, by the failing device, the requirements of the given task with remaining sets of device capabilities on the device list;
determine, by the failing device, that the requirements of the given task match a second given set of device capabilities associated with a second given device; and
in response, send, by the failing device to the second given device, a second request to transfer the given task.

10. The medium of claim 9, wherein the one or more processors are further caused to:
when no other set of device capabilities on the device list matches the requirements of the given task, fail the task transfer.

11. The medium of claim 8, wherein the one or more processors are further caused to:
in response to receiving the request to transfer the given task, determine, by the given device, whether resources are available at the given device to complete the given task;
in response to determining that the resources are available at the given device to complete the given task, send, by the given device to the failing device, an acceptance of the request and configuring the given task on the given device; and
in response to determining that the resources are not available at the given device to complete the given task, send, by the given device to the failing device, a rejection of the request.

12. The medium of claim 8, wherein the comparing of the requirements of the given task and the sending of the request comprise:
compare, by the failing device, the sets of device capabilities on the device list with requirements of a first given task and requirements of a second given task of the one or more tasks;
determine, by the failing device, that a first set of device capabilities associated with a first given device matches the requirements of the first given task and a second set of device capabilities associated with a second given device matches the requirements of the second given task; and
in response, send, by the failing device, a first request to the first given device to transfer the first given task and a second request to the second given device to transfer the second given task.

13. The medium of claim 8, wherein the determining that the requirements of the given task match the given set of device capabilities and the sending of the request comprise:
determine, by the failing device, that two or more sets of device capabilities on the device list match the requirements of the given task;

using data from one or more of the plurality of devices in the network, select, by the failing device, a given set of the two or more sets of device capabilities; and send, by the failing device, the request to transfer the given task to the given device associated with the given set of the two or more sets of device capabilities.

14. The medium of claim 8, wherein the determining that the failing device will not be able to complete the one or more tasks and the sending of the request comprise:

during the performance of the given task, determine, by the failing device, that the failing device will not be able to complete the given task; and send, by the failing device to the given device, the request to transfer a remainder of the given task to the given device.

15. A system comprising:

one or more processors; and a computer readable storage medium having program instructions embodied therewith, the program instructions executable by one or more processors to cause the one or more processors to perform operations comprising:

determining that a failing device of a plurality of devices will not be able to complete one or more tasks configured on the failing device;

comparing requirements of a given task of the one or more tasks with sets of device capabilities on a device list, each set of device capabilities being associated with a device of the plurality of devices;

determining that the requirements of the given task match a given set of device capabilities associated with a given device; and in response, sending to the given device a request to transfer the given task.

16. The system of claim 15, wherein the operations further comprise:

determining whether an acceptance or a rejection of the request is received from the given device;

in response to receiving the rejection of the request from the given device, comparing the requirements of the given task with remaining sets of device capabilities on the device list;

determining that the requirements of the given task match a second given set of device capabilities associated with a second given device; and in response, sending to the second given device a second request to transfer the given task.

17. The system of claim 15, wherein the operations further comprise:

in response to receiving the request to transfer the given task, determining whether resources are available at a given device of the plurality of devices to complete the given task;

in response to determining that the resources are available at the given device to complete the given task, sending to the failing device an acceptance of the request and configuring the given task on the given device; and in response to determining that the resources are not available at the given device to complete the given task, sending to the failing device a rejection of the request.

18. The system of claim 15, wherein the comparing of the requirements of the given task and the sending of the request by the failing device comprise:

comparing the sets of device capabilities on the device list with requirements of a first given task and requirements of a second given task of the one or more tasks;

determining that a first set of device capabilities associated with a first given device matches the requirements of the first given task and a second set of device capabilities associated with a second given device matches the requirements of the second given task; and in response, sending a first request to the first given device to transfer the first given task and a second request to the second given device to transfer the second given task.

19. The system of claim 15, wherein the determining that the requirements of the given task match the given set of device capabilities and the sending of the request by the failing device comprise:

determining that two or more sets of device capabilities on the device list match the requirements of the given task;

using data from one or more of the plurality of devices in the network, selecting a given set of the two or more sets of device capabilities; and sending the request to transfer the given task to the given device associated with the given set of the two or more sets of device capabilities.

20. The system of claim 15, wherein the determining that the failing device will not be able to complete the one or more tasks and the sending of the request by the failing device comprise:

during the performance of the given task, determining that the failing device will not be able to complete the given task; and sending to the given device the request to transfer a remainder of the given task to the given device.

* * * * *